July 27, 1926.
C. S. BARRELL
TIRE CHAIN
Filed March 9, 1921
1,593,644
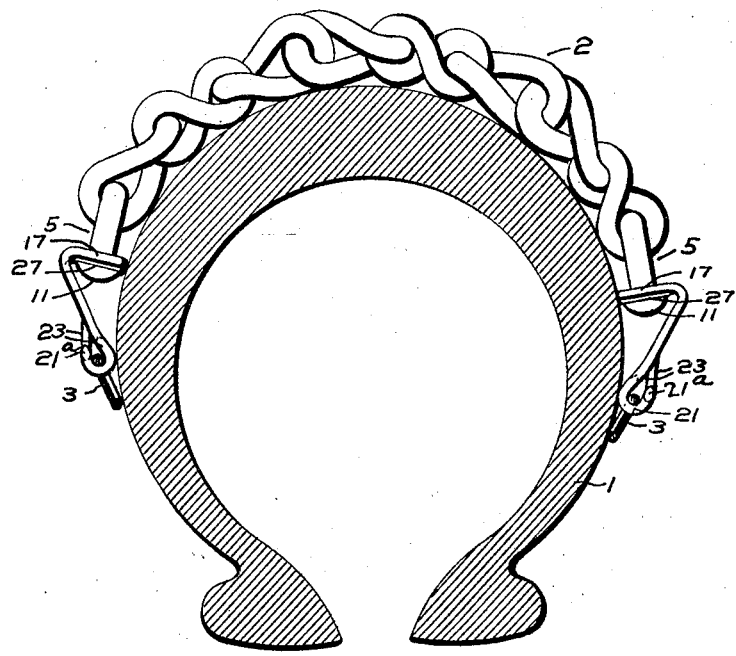
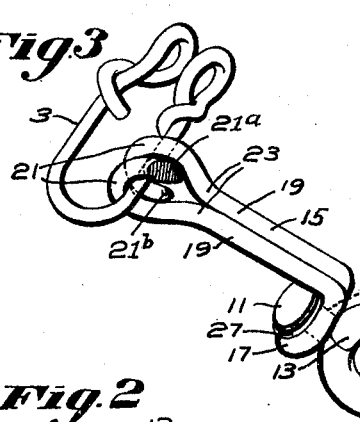
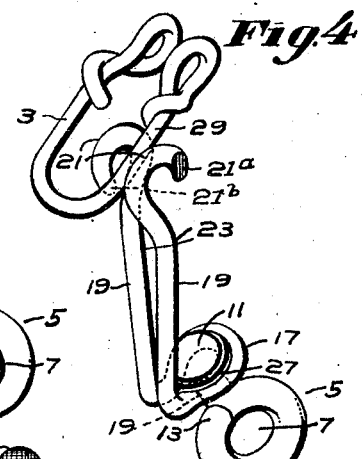
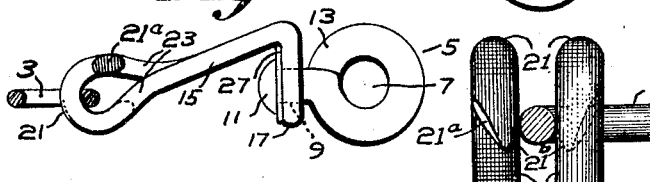
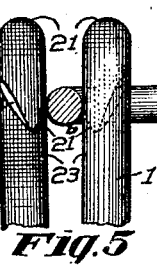
Inventor:
Charles S. Barrell
by Rob H. Harris
Attorney Patented July 27, 1926.

1,593,644

UNITED STATES PATENT OFFICE.

CHARLES S. BARRELL, OF BOSTON, MASSACHUSETTS.

TIRE CHAIN.

Application filed March 9, 1921. Serial No. 450,805.

The invention to be hereinafter described relates to anti-skid or traction chains for vehicle tires, and more particularly to means for readily detachably connecting the ends of the cross members or chains to the circular side members or chains.

Tire chains experience hard usage, and the cross chains become worn and frequently break, so that it is necessary from time to time to substitute new cross chains therefor. The ends of the cross chains must be securely connected to the circular side chains or members, the construction being such that when a cross chain becomes broken, tools must be employed to disconnect the loose ends of the cross chains from the side chains. This is a difficult and inconvenient operation, and usually requires the services of a skilled mechanic.

One of the purposes of the present invention, therefore, is to provide strong and simple means for detachably connecting the ends of the cross chains or members with the circular side chains or members, the construction being such that the necessity for tools is dispensed with, and the ends of the cross chains or members may be quickly and easily connected with the circular side chains, or disconnected therefrom by manipulation or relative adjustment of the ends of the cross chains with respect to the side chains.

With the aforesaid and other purposes in view, the character of the invention will be best understood by reference to the following description of one good form of the invention shown in the accompanying drawing:

Fig. 1 is a transverse section through the shoe of a pneumatic tire equipped with an anti-skid or traction chain embodying the invention;

Fig. 2 on an enlarged scale is a side view of means at one end of a cross chain for detachably connecting the latter with a link of the circular side chain, said link being shown in section;

Fig. 3 is a perspective view of the construction shown in Fig. 2;

Fig. 4 is a perspective view of the construction showing the relation of parts in the course of presenting the link of the circular side chain to the end of the cross chain; and Fig. 5 is a detail to be referred to.

Referring to the drawing, 1 (Fig. 1) designates a shoe of a pneumatic tire of usual construction. 2 designates one of the cross members or chains of a tire chain having its ends connected to links 3 of the usual circular side chains which are located at the sides of the shoe.

At each terminal of the cross chain is a link 5 conveniently formed of wire bent to present an eye 7 and a stud 9 provided with a head 11. The end 13 of the wire before being bent to present the eye 7, may be entered through the adjacent link of the cross chain, and then may be bent around toward the shank 9 to close said eye, and thereby secure the same to said link.

The device for detachably connecting each end of the cross chain to a side chain link, in the present instance of the invention, comprises a wire 15 bent intermediate its ends to present an eye 17 which may encircle the link stud 9. The wire is bent transversely to the plane of the eye 17 to provide arms 19 which may extend from said eye side by side in general parallel relation. The ends of the arms may be bent to present hooks 21 extending in opposite directions, but normally lying side by side. These hooks are preferably short, and terminate adjacent the shoulders 23 of the arms formed at the juncture of the hooks with the shanks of the arms. This enables the hook ends to be bent inward so that the end of each hook will extend along the portion of the other hook and be within the outline thereof. As a consequence, the ends of the hooks do not project outward so as to come into injurious contact with the tire.

The ends of the hooks may have beveled or chamfered portions 21$^a$ inclined in toward the arms 19 and in some instances it may be desirable to provide said ends with beveled or chamfered portions 21$^b$ opposed to the portions 21$^a$, but preferably shorter than the latter. The beveled portions may also be tapered toward the tips of the ends.

Preferably the arms 19 extend obliquely with respect to the plane of the eye 17, so that the seats of the hooks will be substantially in line with the stud 9, and thereby enable the hooks and the links of the circular side chains with which they are connected, to lie closely adjacent to the sides of the tire.

A bearing member, in the present instance, in the form of a washer 27 may be interposed between the eye 17 and the head 11 of the stud 9. It will be understood that this bearing member is inserted onto the stud 9 against the head 11 before the end of the wire forming the link 5 is bent over toward said stud.

When it is desired to connect the device with a link of the circular side chain, the side bar 29 of the link is presented to the ends of the hooks 21 substantially in the plane of the latter, and then said bar is pressed inward, thereby spreading the hooks apart, substantially as shown in Fig. 4. Continued pressure of said bar inward brings the same beyond the beveled ends of the hooks, and since the portions of the hooks adjacent the shoulders 23 engage the bar 29 at offset points, the resilience of the arms 19 tending to hold the arms side by side, will rock the bar 29 from its position parallel with the planes of the hooks to a position transverse or perpendicular thereto, the beveled ends 21$^b$ of said hooks serving to facilitate such rocking movement of the link. Then outward movement of the bar 29 will cause the same to seat against the hooks, and the parts will be in the relation shown in Fig. 3. The arms 19, although resilient, have considerable stiffness, the construction being such that the hooks 21 are normally held side by side in close relation, and the pull on the device in use tends to maintain the same securely connected with the link of the circular side chain.

It will be noted that the hooks are short, and this contributes to the stiffness thereof, and tends to prevent inadvertent separation of the device from the link of the side chain. If the latter in use slackens so that the bar 29 of the link of the side chain may move away from the seats of the hooks, said bar will engage the shoulders 23 at the points of juncture of the hooks with the arms 19, and the relation of the terminals of the hooks with respect to said shoulders is such that there is no danger that the bar 29 of the link will work in between the hooks and escape therefrom.

The swivel connection of the hook device with the cross chain is important, since it enables the cross chain readily to rotate and creep along the tire in use without imparting rotative movement to the hook device, and without danger that the planes of the hooks 21 shall be turned into parallelism with the link bar 29, and thereby further contributes to prevention of inadvertent separation of the hook device from the link.

When in use the cross chain becomes worn or broken so that it is desirable to substitute a new cross chain therefor, the loose ends of the cross chains may be readily disconnected from the circular side chain links by pressing the link bar 29 inward toward the shoulders 23, and then imparting a twist to the bar so as to bring the same into a plane substantially parallel with the planes of the hooks. The bar may ride along the beveled portions 21$^a$ of the hooks, thereby to facilitate twisting or rocking of the same to this position. Then the link bar 29 may be pulled outward in between the beveled portions 21$^b$ of the hooks and escape therefrom.

The beveled portions 21$^a$ enable the bar to commence to rock toward its position of release between the hooks (Fig. 5) before reaching and passing beyond the tips of the hook ends. In thus rocking, the link bar fulcrums on the shank of one of the hooks, and bears against an offset portion of the shank of the other hook. As a consequence the hooks are readily spread apart so as to allow the bar to escape between them.

After removal of the broken cross chain, the ends of a new cross chain may then be readily connected to the circular side chain links as described. It will be noted that these operations may be quickly and easily performed, and without requiring the use of a tool or tools or the services of a skilled mechanic.

The hook device described is simple and cheap in construction, and thoroughly practicable in use.

It will be understood that the invention is not limited to the embodiment shown, and that various deviations may be made therefrom without departing from the spirit and scope of the appended claims.

What is claimed is:—

1. A device for detachably securing cross members to side members of tire chains comprising a wire bent intermediate its ends to present a swivel eye adapted to receive a stud adjacent the end of the cross member, resilient arms projecting from said eye and forming an angle with said eye, oppositely directed hooks projecting from said arms and disposed side-by-side, and shoulders at the juncture of the hooks with said arms cooperating with said hooks to form registering eyes, the tips of the hooks extending to points closely adjacent to the shoulders and each hook having a portion lying across the space between the tip and shoulder of the other thereby normally to prevent the side member from moving beyond the shoulders, said hooks being separable to admit the side member between said hooks beyond their tips toward said shoulders and into said registering eyes.

2. A device for detachably securing cross members to side members of tire chains, comprising a wire bent intermediate its ends to present a swivel eye, resilient arms projecting from said eye, oppositely directed hooks normally lying side-by-side, and abrupt shoulders at the juncture of the hooks with said arms and cooperating with said hooks to form registering eyes, the tips of the hooks extending to points closely adjacent to the shoulders and each hook having a portion lying across the space between the tip and shoulder of the other thereby normally to prevent the side member from moving beyond the shoulders, said hooks being separable against the inherent resilience of said arms to admit the side member between said hooks beyond their tips toward said shoulders and into the eyes formed by said hooks and shoulders.

3. A device for detachably securing cross members to side members of tire chains, comprising a wire bent intermediate its ends to present a swivel eye, resilient arms projecting from said eye, oppositely directed hooks normally lying side-by-side, and abrupt shoulders at the juncture of the hooks with said arms and cooperating with said hooks to form registering eyes, the tips of the hooks extending to points closely adjacent to the shoulders and each hook having a portion lying across the space between the tip and shoulder of the other thereby normally to prevent the side member from moving beyond the shoulders, said hooks being separable against the inherent resilience of said arms to admit a side member between said hooks beyond their tips and into the eyes formed by said hooks and shoulders, the tips of said hooks being provided with outer beveled and tapered portions to facilitate separation of the device from the side member.

4. A device for detachably securing cross members to side members of tire chains, comprising a wire bent intermediate its ends to present a swivel eye, resilient arms projecting from said eye, oppositely directed hooks normally lying side-by-side, and abrupt shoulders at the juncture of the hooks with said arms and cooperating with said hooks to form registering eyes, the tips of the hooks extending to points closely adjacent to the shoulders and each hook having a portion lying across the space between the tip and shoulder of the other thereby normally to prevent the side member from moving beyond the shoulders, said hooks being separable against the inherent resilience of said arms to admit a side member between said hooks beyond their tips and into the eyes formed by said hooks and shoulders, the tips of said hooks being provided with inner beveled portions to facilitate connection of the device with the side member and separation therefrom.

In testimony whereof, I have signed my name to this specification.

CHARLES S. BARRELL.